United States Patent
Fisher et al.

(10) Patent No.: US 7,051,244 B2
(45) Date of Patent: May 23, 2006

(54) METHOD AND APPARATUS FOR MANAGING INCIDENT REPORTS

(75) Inventors: Douglas A. Fisher, Fort Collins, CO (US); Eric W. Loy, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 544 days.

(21) Appl. No.: 10/285,076

(22) Filed: Oct. 31, 2002

(65) Prior Publication Data

US 2004/0153693 A1 Aug. 5, 2004

(51) Int. Cl.
*G06F 11/00* (2006.01)

(52) U.S. Cl. ........................................ 714/48

(58) Field of Classification Search ............... 714/48, 714/49, 57, 47, 39, 37; 707/2, 104; 709/206, 709/207, 217
See application file for complete search history.

(56) References Cited

U.S. PATENT DOCUMENTS

| | | | | |
|---|---|---|---|---|
| 5,528,759 A | * | 6/1996 | Moore | 709/224 |
| 5,828,830 A | * | 10/1998 | Rangaraian et al. | 714/48 |
| 5,978,787 A | * | 11/1999 | Wong et al. | 707/2 |
| 5,999,604 A | * | 12/1999 | Walter | 379/133 |
| 6,148,335 A | * | 11/2000 | Haggard et al. | 709/224 |
| 6,199,058 B1 | * | 3/2001 | Wong et al. | 707/2 |
| 6,266,788 B1 | * | 7/2001 | Othmer et al. | 714/38 |
| 6,360,246 B1 | * | 3/2002 | Begley et al. | 709/203 |
| 6,377,955 B1 | * | 4/2002 | Hartmann et al. | 707/104.1 |
| 6,678,250 B1 | * | 1/2004 | Grabelsky et al. | 370/241 |
| 6,778,638 B1 | * | 8/2004 | Jean et al. | 379/9.02 |
| 2003/0126307 A1 | * | 7/2003 | Lindner et al. | 709/318 |

* cited by examiner

*Primary Examiner*—Nadeem Iqbal

(57) ABSTRACT

Incident report management is provided for managing received incident reports in an enterprise environment. The incident report management includes a correlator configured to determine whether a received incident report correlates with a previously received incident report, wherein received incident reports of new incidents are forwarded to a response queue.

25 Claims, 3 Drawing Sheets

METHOD AND APPARATUS FOR MANAGING INCIDENT REPORTS

CROSS-REFERENCE TO RELATED PATENT APPLICATIONS

This application hereby incorporates by reference for all purposes the specifications and drawings of application Ser. No. 10/225,785 filed on Aug. 21, 2002, Adam Carr et al., application Ser. No. 09/851,963 filed on May 10, 2001, Van Giel et al., and application Ser. No. 10/135,398 filed on May 1, 2002, Soto et al., all of which have the same assignee as the present application.

BACKGROUND OF THE INVENTION

A. Field of the Invention

The present invention relates generally to providing maintenance and support of both hardware and software on computers.

B. Description of the Related Art

As a number of personal computers and servers used throughout business enterprises has increased, and as the price of the hardware and software has decreased, the cost of setting up and maintaining a large array of networked computers has come to be dominated by cost of servicing the computers and keeping them all operating. In the past, this was done by manual intervention, with service personnel visiting each computer or with the computers being brought in for repair. But the cost of providing such manual service is high, and the difficulties of providing trained staff members able to cope with any problem that might arise on any given computer has also grown. Additionally, the time it takes for service personnel to visit a site greatly increases the time during which a given computer may be out of service due to some problem.

Accordingly, attempts have been made in the past to automate some or all of the tasks relating to computer maintenance and repair. With respect to personal computers, a first approach has been to make available to the user, on the computer itself and also within service sites maintained on the Internet, knowledge data bases containing detailed documentary descriptions of the programs, and also self-help tools. Thus, for example, one may learn from a centralized database that new software drivers for hardware accessories are available, and these may be downloaded and automatically installed on personal computers. Likewise, software patch analyzers are available which can trace a problem to software defects and which can suggest the downloading of more recent versions of the software that may cure those problems.

An even more sophisticated approach to PC maintenance is provided by the ServiceNet platform developed by Motive Communications, Incorporated. ServiceNet is designed around a self-help paradigm in which a person using a desktop computer notices a problem and then manually opens a "trouble ticket" that is transmitted to a support provider. The PC operator uses a web interface to report the program to a program called Chorus Client, which is an incident escalator. The incident escalator first may try to run prewritten diagnostic scripts or provide "self-help" tools. It may then "isolate" the incident, running scripts to gather configuration data, and then combining the user's problem description and then configuration data with contact information identifying the user of the computer and including such things as name, e-mail address, and telephone number. It may also gather host information from the PC. These are transmitted to an incident receiver which parses the information and passes it on to a central analysis server where a program called Duet, in combination with a program called Insight, enable the provision of "online" assistance by a service engineer to review the problem in the context of the user's computer as configured and to provide assistance.

In general, self-support tools such as those described above do not offer automated monitoring nor automated problem detection capabilities. To the extent that such capabilities are available, automated problem detection and support currently focuses upon product-specific or market-specific functionality. For example, Hewlett Packard provides a product called predictive support that enables remote failure detection for the Hewlett Packard HP3000 and HP9000 business servers. This is a modem-based solution, where each client computer directly dials into a support center to give notification of a device failure. In the area of disk drives, Hitachi has a system called Hi-Track that provides remote event management and configuration management for the Hitachi 7700 and 7900 disc arrays. EMC provides similar functionality for its Symmetrix line of storage devices. Hewlett Packard's High Availability Observatory (HAO) provides remote event management for Hewlett Packard's line of SuperDome servers and also configuration management for their HP9000 servers, Windows 2000 servers, and some proprietary routers and switches. Hewlett Packard also has a product called Network Support Platform which provides configuration management, discovery, and remote connectivity for network interconnect devices that include Hewlett Packard, Cisco, and Nortel routers, switches, and hubs.

While these products are useful, they do not provide an efficient tool for responding to and managing incident reports generated by several computers using common pieces of equipment (e.g., printers, disc arrays, etc.

SUMMARY OF THE INVENTION

Incident report management is provided for managing received incident reports in an enterprise environment. The incident report management includes a correlator configured to determine whether a received incident report correlates with a previously received incident report, wherein received incident reports of new incidents are forwarded to a response queue.

DETAILED DESCRIPTION OF THE EMBODIMENTS

Reference will now be made in detail to exemplary embodiments of the invention. Wherever possible, the same reference numbers will be used throughout the drawings to refer to the same or like parts.

An embodiment of the present invention is primarily built on top of, and is designed to enhance and augment, a product called the ServiceNet Platform developed by Motive Communications, Incorporated. This embodiment can be used, for example, in conjunction with the method for service based remote support delivery described in co-pending application Ser. No. 10/225,785 (the "Carr application" hereafter) referenced above.

For purposes of illustration and explanation only, one exemplary embodiment of the present invention is set forth below as an improvement to an embodiment described in the Carr application. Other applications are also plausible, as would be readily apparent to one of ordinary skill in the art after reading this disclosure.

Figure 1:
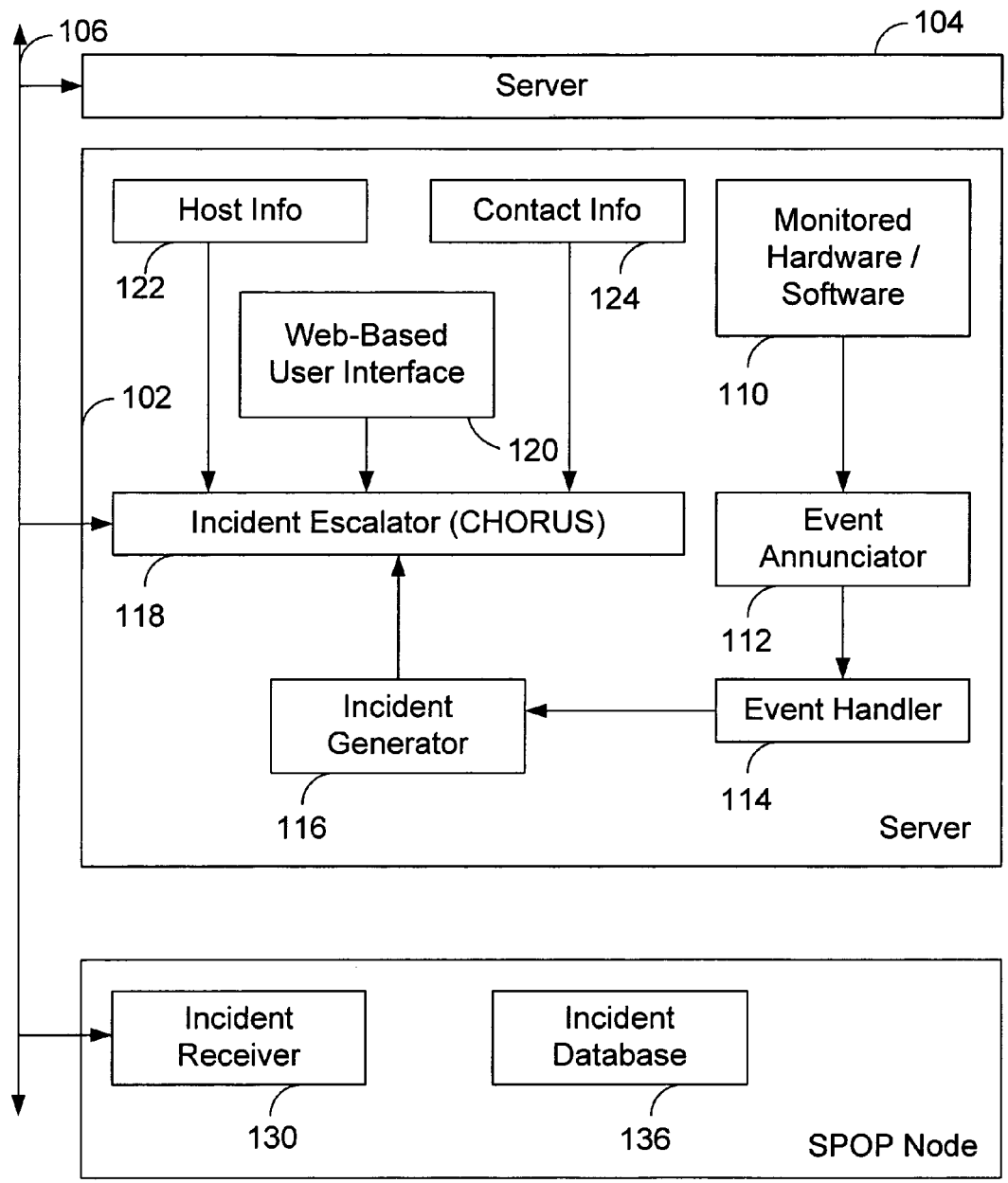
FIG. 1 is a block diagram of an SPOP node used to monitor both reactive and proactive incidents originating from a number of servers at a site according to an embodiment of the present invention.

With reference to FIG. 1, a server 102 is shown. Assuming for the moment, for the purpose of briefly describing ServiceNet, that this is a personal computer (rather than a server), the ServiceNet system works conventionally (in its unmodified state) in the following manner. When the user of this personal computer detects a problem, the user clicks on a "service" icon (on the user's desktop or within an application, for example) that causes a web browser to bring up a web-based user interface 120 which provides the user with a form into which the user may enter a description of the problem. This information is then passed to a program called Motive Chorus, a client program that resides upon the personal computer and that serves as an interactive assistance tool, capable of running diagnostic scripts, and also as an incident escalator 118. In addition, the personal computer contains host information 122 and also contact information 124 defining the name, phone number, e-mail address of the operator of this particular computer to make it possible for service personnel to contact that individual. The escalator 118 may also run scripts to gather configuration data. The incident escalator 118 combines this configuration data, host information, and contact information with the user-supplier information defining the incident, and then all of this information is passed on to an incident receiver 130 which records the incident in a database 136. Then programs called Motive Insight, Motive Duet, and Management Console information enable a service engineer to study the problem and to come up with possible solutions.

Two typical servers 102 and 104 (which may or may not be unattended) are shown in FIG. 1, and are presumed to be in an enterprise environment, interconnected by a network 106 to other enterprise devices. As can be seen, these servers are each equipped with an incident escalator 118, a web-based user interface 120, host information 122, and contact information 124. But since these servers may run unattended, it is often not possible to manually institute the creation of an incident record using the web-based user interface 120, as with a personal computer having a human operator. Instead, automatic event detectors can be relied upon to detect significant events.

The server 102 contains both hardware and software that is monitored at 110. Associated with the monitored hardware and software 110 are one or more event annunciators 112. These event annunciators 112 may take widely differing forms depending on the nature of the hardware or software that is monitored. For example, in some hardware, the event annunciators may be triggered into operation by an event occurring within or initiated by the hardware, such as an interrupt event or possibly a DMA event; or the annunciator may be placed into operation periodically by a timing mechanism to check for events. Thus, for example, in the case of a disk drive, the event annunciators may check records maintained by a disk drive of how frequently the drive is encountering certain types of errors, and may compare those records to limit values for error counts. Other event annunciators may check to see how rapidly software is operating, how many hardware errors are occurring during memory accesses, or they might check the basic configuration of the machine and its software both alone and also in comparison to other servers that are grouped together with this server to form a "cluster" so that they, the servers, may back each other up in case of a server failure.

When the event annunciator 112 discovers an event, it generates an announcement of the event, typically as an SNMP or TCP/IP message, that is routed to an event handler 114.

The event handler 114 is also customized to the monitored hardware or software 110, and follows up by investigating the event to see whether the event is one that may be ignored, whether it simply needs to be logged but does not require an immediate response, or whether the event should be reported as an incident that may need to be brought to the attention of service personnel. Both the event annunciator 112 and the event handler 114 are custom designed to match the server 102's hardware and operating system. The event handler 114 resides upon the server 102, but it can communicate with both the event annunciator 112 and the monitored hardware or software 110 over the network. Alternatively, it may reside on another machine, or even upon the SPOP node 108.

If the event handler 114 decides that an incident report needs to be generated, the event handler generates a command line call which it passes to the operating system shell to be executed by the operating system. It thereby places into operation an incident generator 116. The incident generator 116 has a generalized interface that makes it able to accept such calls from any kind of event annunciator and handler monitoring any type of hardware or software. The interface is a general one which transforms the incoming information into a standardized form as may be required by the incident escalator. The incident generator transforms the event information into the precise form required by the incident escalator and again calls upon the operating system shell to execute the incident escalator, passing the necessary information to it to cause the creation of an incident report, just as if the information had come from a user through the user interface 120. As explained above, the incident escalator 118 combines this incident information with contact information 124 defining who should be contacted and also with general host information 122 defining the hardware and software configuration of the server 102, and it forwards all of this information on to a central support vendor response center as a report of a service or maintenance incident.

In addition to responding to hardware and software events occurring in real time, the incident generator 116 may respond to the periodic execution of configuration scripts included among the prewritten diagnostic scripts which are triggered periodically to survey the general configuration of the server 102, providing an archival time record of the server's configuration and how it has changed over time. The configuration data can be of great benefit to service personnel. The configuration data is essentially disguised to appear to be an "incident" for purposes of combining it with host and contact information 122 and 124 and delivering it to a central response center acting on the incident database 136.

Problems can arise, however, where a single piece of monitored hardware/software 110 commonly shared by multiple servers 102, 104 (e.g., a disc array, printer, etc.) undergoes some type of failure, such as a crash, power outage, etc. In this type of situation, each of the servers 102, 104 may generate and send an incident report indicative of the same problem, which can result in an accumulation of multiple incident reports of the very same failure being delivered to the central response center. This problem can be particularly acute in the aforementioned automated response scheme, where every server 102, 104 connected to the common piece of equipment will generate an incident report in response to the equipment failure.

Figure 2:
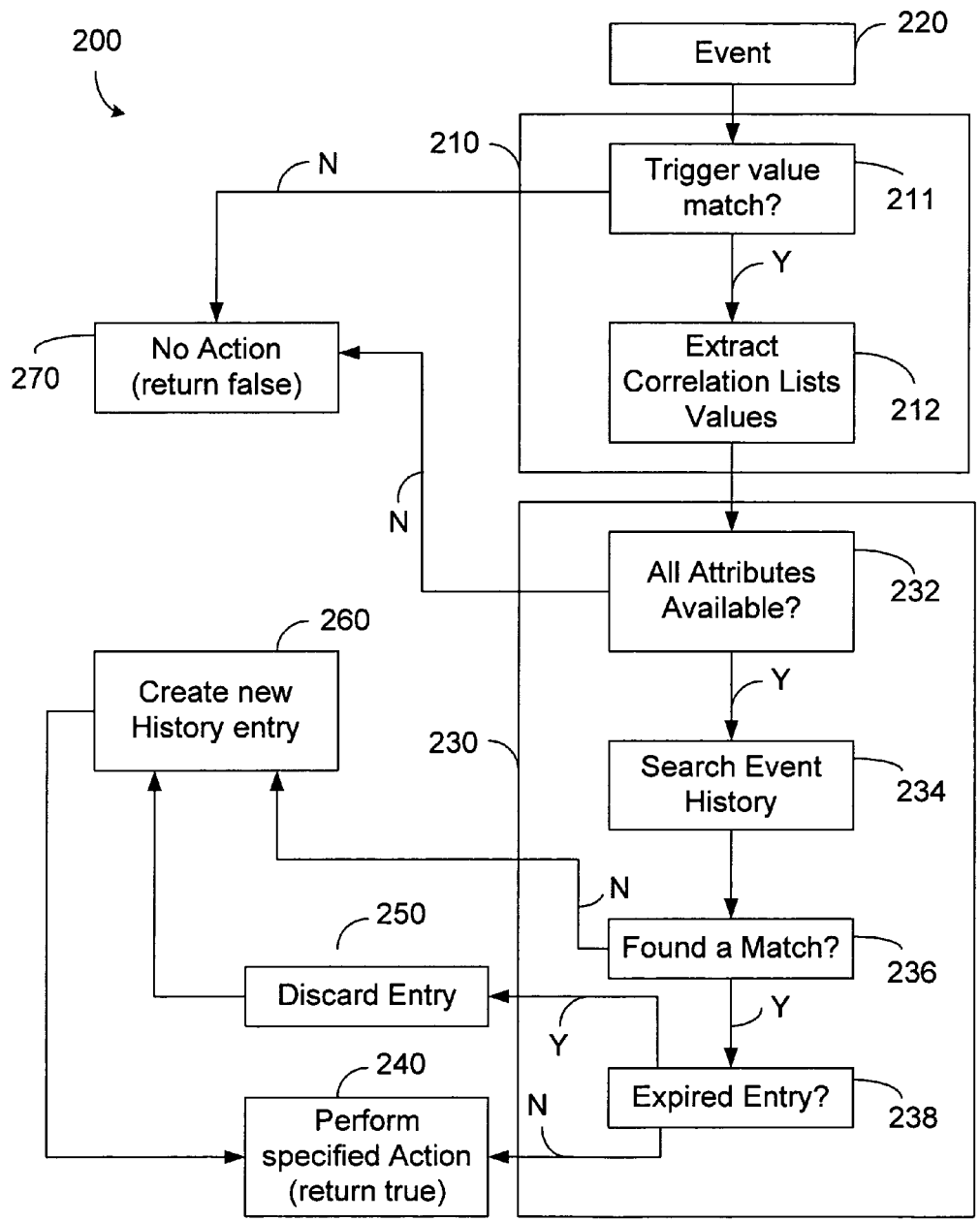
FIG. 2 is a block diagram of an incident report manager according to an embodiment of the present invention.

Hence, an incident report manager 200 for managing received incident reports according to one embodiment of the present invention is shown in the block diagram of FIG. 2. The incident report manager 200 determines whether a received incident report or event 220 correlates with one or more previously received incident reports or events.

As shown in FIG. 2, the incident report manager 200 may include a trigger detector 210 configured to determine the report type of a received incident report or event 220. By way of example but not by way of limitation, the trigger detector 210 may identify (by trigger value match—step 211) report types such as device failures, power outages, etc., and categorize the reports accordingly. If a report is of a predetermined type, the trigger detector 210 extracts correlation list values (step 212) for presentation to an attribute filter 230. According to one aspect of the present invention, the incident report manager 200 includes a discard filter (not shown) as part of, or separate from, attribute filter 230. The discard filter discards received incident reports or events 220 of predetermined types, such as those which are not handled by the central response center (for example, log file entries, etc.). The remaining incident reports or events 220 (e.g., those handled by the central response center) are then sent to attribute filter 230.

The attribute filter 230 is configured to correlate at least one attribute of each received incident report or event 220 with a corresponding number of attributes of previously received incident reports or events of the same report type, though in many implementations the attribute filter 230 will be correlated against a plurality of attributes to increase the accuracy of the correlation. Such attributes may include, for example, an event generator identification (ID), an event ID, a monitor name, a monitor version, a product ID, an event severity, a system handle, a system host name, a system internet protocol (IP) address, an EMS version, a STM version, a device ID, a device name, a device path, a device serial number, a device vendor, a device GUID, a device class, an event class, a system firmware, a system software ID, a system serial number, a business identifier, and a company name. More generally, an attribute is data within an incident report whose value identifies a particular node, computer, piece of equipment, software, etc. that is associated with a particular event's location.

If all the attributes are not available, then the correlation process terminates (step 232), and no action is taken (step 270). Otherwise, the event history file for the same type of events received recently is searched (step 234).

If a predetermined number of attributes of previously received incident reports of the same report type do not correlate with the same attributes in the presently received incident report or event 220, then a match has not been found (step 236). In that case the incident report or event 220 is considered to be "new" and a history entry is created and forwarded to a response queue (step 260) at the central response center to perform (or initiate) some specified action (step 240). If correlation does occur (step 236) such that the incident report or event is redundant and if the incident report is considered to be too "old" (step 238), the incident report or event 220 can be discarded (step 250) and a history entry is created and forwarded to the response queue (Step 260). Alternatively, correlated incident reports may be placed into a separate response queue given a low response priority etc. Exemplary software code for performing the correlation is attached as an APPENDIX. The software code provided may, for example, be fed into and used to configure the parser of MOTIVE and may thereby be established and placed into operation.

The incident report manager 200 may also include a prioritization filter as part of, or separate from, the specified action step 240. The prioritization filter may be configured to prioritize the received incident reports of new incidents for the response queue. Thus, received incident reports of a predetermined type, such as critical device failures, may be given a higher priority for response by the central response center than lesser incident reports, such as a low toner warning for a network printer.

The new history entry created (step 260) can be stored in a general incident database, or be maintained internally depending on the particular implementation. By way of example, the new history entry may include information about previous events that have been received so that the correlator does not have to search through all of the events in the database to find duplicative events.

Alternatively or in combination with the previously described history entry example, the new history entry may create a time window for each individual event. When a "new" incident comes in, the attributes and values needed by the correlator may be stored along with the date/time when the incident report was received, which can be used to check future incidents that come in. This "suppression" time period can be set for each correlation, such that when the information stored for an incident is older than the specified suppression period, the information is discarded from the database.

Alternatively or in combination with the previously described history entry example(s), the new history entry may include link information linking a received incident report with previously received incident reports. Links may include, for example, database pointer information as part of the new history entry. The linking information can be used to facilitate quicker correlation, and/or to facilitate statistical analysis of received incident reports.

By correlating received incident reports with previously received incident reports, the number of old or redundant incident reports can be greatly reduced. This improves the efficiency of the response center by not having to send service personnel to address the incident report if it has already been dealt with or scheduled. Furthermore, the incident report manager can be installed directly at the customer site, which would reduce the number of incident reports transmitted to the response center, and thereby reduce the corresponding amount of network traffic associated therewith.

Figure 3:
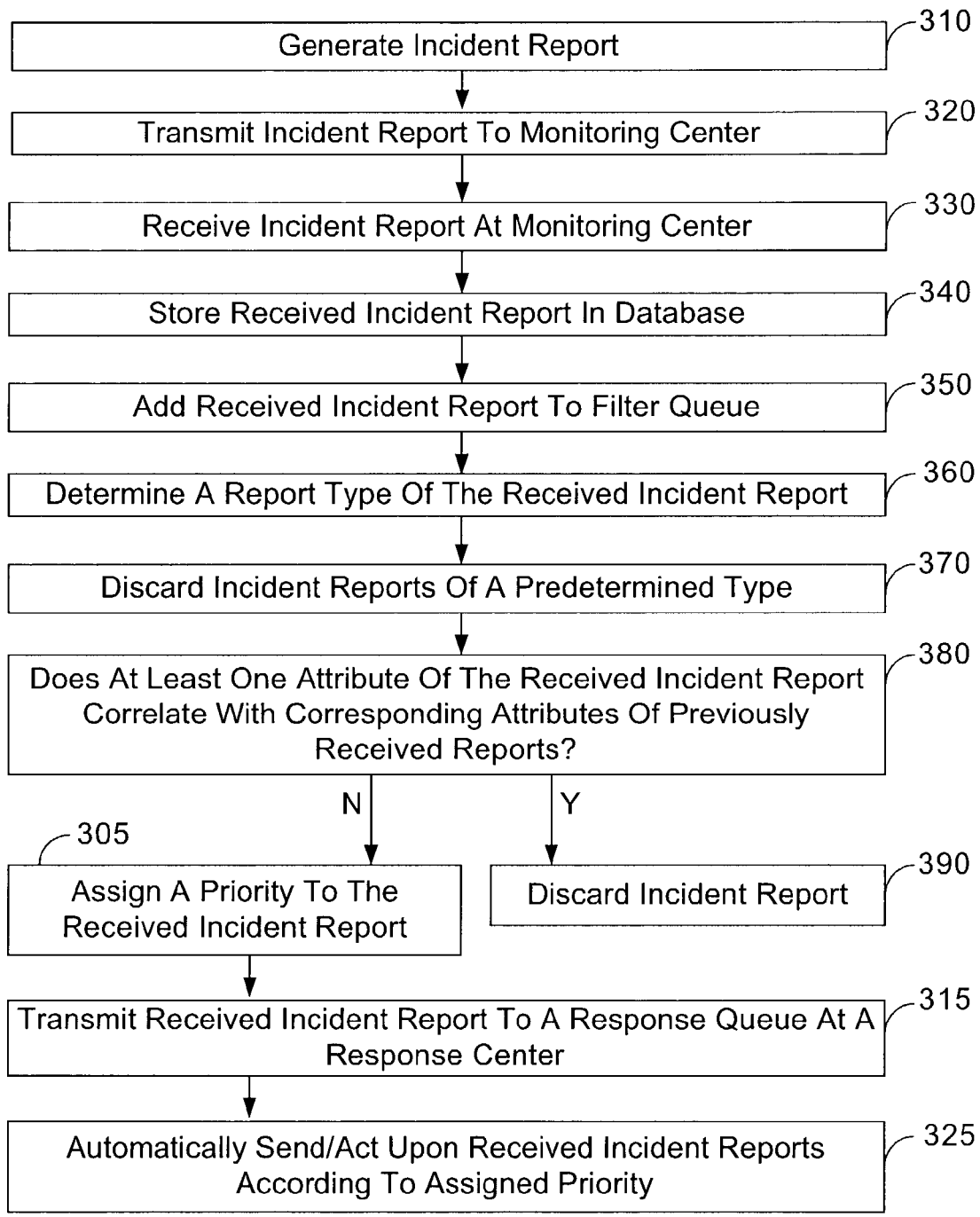
FIG. 3 is a flow chart of a method of managing incident reports according to an embodiment of the present invention.

A method of managing received incident reports will now be described in reference to the flow chart of FIG. 3. As would be readily apparent to one of ordinary skill in the art after reading this disclosure, various method steps may be combined or performed in a different order than shown depending on the particular implementation. The following method described presumes that one or more incident reports has already been received by a monitoring center.

In step 310, an incident report generator at a customer site generates an incident report regarding a particular piece of equipment and/or software. The incident report is transmitted to a monitoring center in step 320, which may be part of a central monitoring center external to the customer site, or located at the customer site itself. The incident report is received at the monitoring center in step 330, and stored in a database (e.g., an incident database) in step 340. Although the incident report may be manually removed from the database, it is normally kept in the database such that it remains available for statistical reporting, and/or further analysis.

The received incident report is added to a filter queue in step 350, for operating one or more filters on the database. The received incident report type is then determined in step 360, with incident reports of a predetermined type (e.g., incident reports not handled by the central response center) being automatically discarded in step 370.

In step 380, at least one attribute of the received incident report is correlated with corresponding attributes of previously received incident reports. Step 380 may include one or more attribute filters correlating a particular attribute either in series or in parallel, or a single attribute filter correlating a plurality of attributes in a single pass. If the received incident report correlates with corresponding attributes of previously received incident reports, it is deemed to be "old" or "redundant" and is discarded in step 390.

If the received incident report does not correlate with corresponding attributes of previously received incident reports, it is deemed to be "new" and is assigned a response priority in step 305. The prioritized incident report is then transmitted to a response queue at the central response center in step 315, for automatic action by the response center in step 325.

The aforementioned method allows for dynamic correlation of incident reports as they are received by the monitoring center. This allows for instantaneous elimination of redundant incident reports, and facilitates more efficient response by the central response center for automatically generated incident reports. This method further reduces the inherent problems associated with multiple servers being connected to shared components, by eliminating the possibility of redundant incident reports flooding a central response center.

The foregoing description of various embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined the claims appended hereto, and their equivalents.

APPENDIX

```
<?xml version="1.0" encoding="ISO-8859-1"?>
<!DOCTYPE filter [
<!ELEMENT filter [category_keys,key*,action)>
<!ATTLIST filter name (#PCDATA) #REQUIRED>
<!ATTLIST filter type (#PCDATA) #REQUIRED>
<!ATTLIST filter version (#PCDATA) #REQUIRED>
<!ATTLIST filter priority (#PCDATA) #REQUIRED>
<!ATTLIST filter final (#PCDATA) #REQUIRED>
<!ELEMENT filter (category_keys, key*, FiledToCompare+, action)>
<!ELEMENT (category_keys (application*, enterprise*)>
<!ELEMENT application (#PCDATA)>
<!ELEMENT enterprise (#PCDATA)>
<!ELEMENT key (#PCDATA)>
<!ATTLIST key name (#PCDATA) #REQUIRED>
<!ELEMENT FieldToCompare (#PCDATA)>
```

APPENDIX-continued

```
<!ELEMENT action (#PCDATA)>
<!ATTLIST key type (#PCDATA) #REQUIRED>
]>
.
<filter type="correlation" name="Chassis Code Filter" version="1.0"
    priority="3" final="true">
    <category_keys>
        <enterprise>HP</enterprise>
        <application>HPUXServer</application>
    <category_keys>
    <key name="MonitorName">dm_chassis</key>
    <key name="MonitorName">dm_core_hw</key>
    <key name="MonitorName">ia64_corehw</key>
    <FieldToCompare>MonitorName</FieldToCompare>
    <FieldToCompare>SystemSoftwareID</FieldToCompare>
    <FieldToCompare>EventID</FieldToCompare>
    <action type="close">Filter Correlation - incident
    closed </action>
</filter>
<filter type="correlation" name="Shared Device Filter"version="1.0"
priority="3" final="true">
    <category_keys>
        <enterprise>HP</enterprise>
        <application>HPUXServer</application>
    </category_keys>
    <key name="MonitorName">armmon</key>
    <key name="MonitorName">dm_fc_hub</key>
    <key name="MonitorName">dm_fc_scsi_mux</key>
    <key name="MonitorName">dm_fc_sw</key>
    <key name="MonitorName">ha_disk_array</key>
    <FieldToCompare>MonitorName</FieldToCompare>
    <FieldToCompare>DeviceSerialNumber</FieldToCompare>
    <FieldToCompare>EventID</FieldToCompare>
    <FieldToCompare>DeviceID</FieldToCompare>
    <FieldToCompare>DeviceVendor</FieldToCompare>
    <action type="close">Filter Correlation - incident
    closed</action>
</filter>
```

What is claimed is:

1. An incident report managing device for managing received incident reports in an enterprise environment, comprising:
    a correlator configured to determine whether a received incident report correlates with a previously received incident report; and
    a discard filter configured to discard received incident reports of a predetermined type,
    wherein received incident reports of new incidents are forwarded to a response queue, and
    wherein the predetermined type comprises incident reports not handled by a response center acting on the response queue.

2. The incident report managing device of claim 1, wherein received incident reports of old incidents are discarded.

3. The incident report managing device of claim 1, wherein the correlator is a dynamic correlator operating as each incident report is received.

4. The incident report managing device of claim 1, wherein the correlator is configured to:
    determine a report type of the received incident report; and
    correlate at least one attribute of the received incident report with a corresponding number of attributes of previously received incident reports of the same report type.

5. The incident report managing device of claim 4, wherein an attribute comprises one of an event generator identification (ID), an event ID, a monitor name, a monitor version, a product ID, an event severity, a system handle, a system host name, a system internet protocol (IP) address, an Event Monitoring System (EMS) version, a Support Tools Monitor (STM) version, a device ID, a device name, a device path, a device serial number, a device vendor, a device Globally Unique Identifier (GUID), a device class, an event class, a system firmware, a system software ID, a system serial number, a business identifier, and a company name.

6. The incident report managing device of claim 1, wherein the correlator determines whether filtered incident reports correlate with a previously received incident report.

7. The incident report managing device of claim 1, further comprising:
a prioritization filter configured to prioritize the received incident reports of new incidents for the response queue.

8. The incident report managing device of claim 1, wherein the correlator is installed in a monitoring center which receives incident reports generated externally by a customer incident report generator.

9. A method of managing received incident reports, comprising:
correlating a received incident report with a previously received incident report; and
forwarding received incident reports of new incidents to a response queue; and
discarding received incident reports of a predetermined type,
wherein the predetermined type comprises incident reports not handled by a response center acting on the response queue.

10. The method of claim 9, further comprising:
discarding received incident reports of duplicate incidents.

11. The method of claim 9, further comprising:
storing information about received incident reports in a database for correlating.

12. The method of claim 11, wherein storing received incident reports in a database temporarily stores information about received incident reports for dynamic correlation as each incident report is received.

13. The method of claim 9, further comprising:
prioritizing forwarded incident reports for action by the response center.

14. The method of claim 9, wherein correlating a received incident report with a previously received incident report comprises:
determining a report type of the received incident report; and
matching at least one attribute of the received incident report with a corresponding number of attributes of previously received incident reports of the same report type.

15. The method of claim 14, wherein an attribute comprises one of an event generator identification (ID), an event ID, a monitor name, a monitor version, a product ID, an event severity, a system handle, a system host name, a system internet protocol (IP) address, an Event Monitoring System (EMS) version, a Support Tools Monitor (STM) version, a device ID, a device name, a device path, a device serial number, a device vendor, a device Globally Unique Identifier (GUID), a device class, an event class, a system firmware, a system software ID, a system serial number, a business identifier, and a company name.

16. The method of claim 9, further comprising:
generating a plurality of incident reports at a customer site;
forwarding the incident reports to a monitoring center external to the customer site; and
receiving the incident reports at the monitoring center.

17. The method of claim 9, further comprising:
generating a plurality of incident reports at a customer site; and
forwarding the incident reports to a monitoring device at the customer site,
wherein forwarding received incident reports of new incidents to a response queue forwards the received incident reports of new incidents to an external response center's response queue.

18. The method of claim 9, further comprising:
linking the received incident report with the previously received incident report.

19. An equipment servicing system, comprising:
an equipment monitoring device for generating an incident report of an equipment operating condition;
an incident report manager in communication with the equipment monitoring device so as to receive incident reports therefrom and add received incident reports to a response queue, the incident report manager automatically disregarding redundant incident reports; and
a response center for acting on incident reports in the response queue,
wherein the incident report manager automatically disregards incident reports of a type not serviced by the response center.

20. The equipment servicing system of claim 19, wherein the incident report manager prioritizes received incident reports for action by the response center.

21. The equipment servicing system of claim 19, wherein the incident report manager dynamically analyzes each incident report as each incident report is received to determine whether the received incident report is a redundant incident report.

22. An equipment service manager in communication with a plurality of equipment monitoring devices, the equipment monitoring devices forwarding equipment service reports to the equipment service manager for service by a response center, the equipment service manager comprising:
means for automatically discarding service reports of a predetermined type;
means for dynamically discarding duplicative service reports; and
means for prioritizing new service reports for action by the response center,
wherein the predetermined type corresponds to service reports not handled by the equipment service manager.

23. The incident report managing device of claim 1, further comprising a low priority queue,
wherein received incident reports of old incidents are not discarded but instead placed in the low priority queue.

24. The method of claim 9, further comprising:
placing received incident reports of duplicate incidents in a low priority queue.

25. The incident report managing device of claim 23, wherein the incident reports of old incidents placed in the low priority queue are stored along with link information of one or more new incidents that correlate with the old incidents.

* * * * *